UNITED STATES PATENT OFFICE.

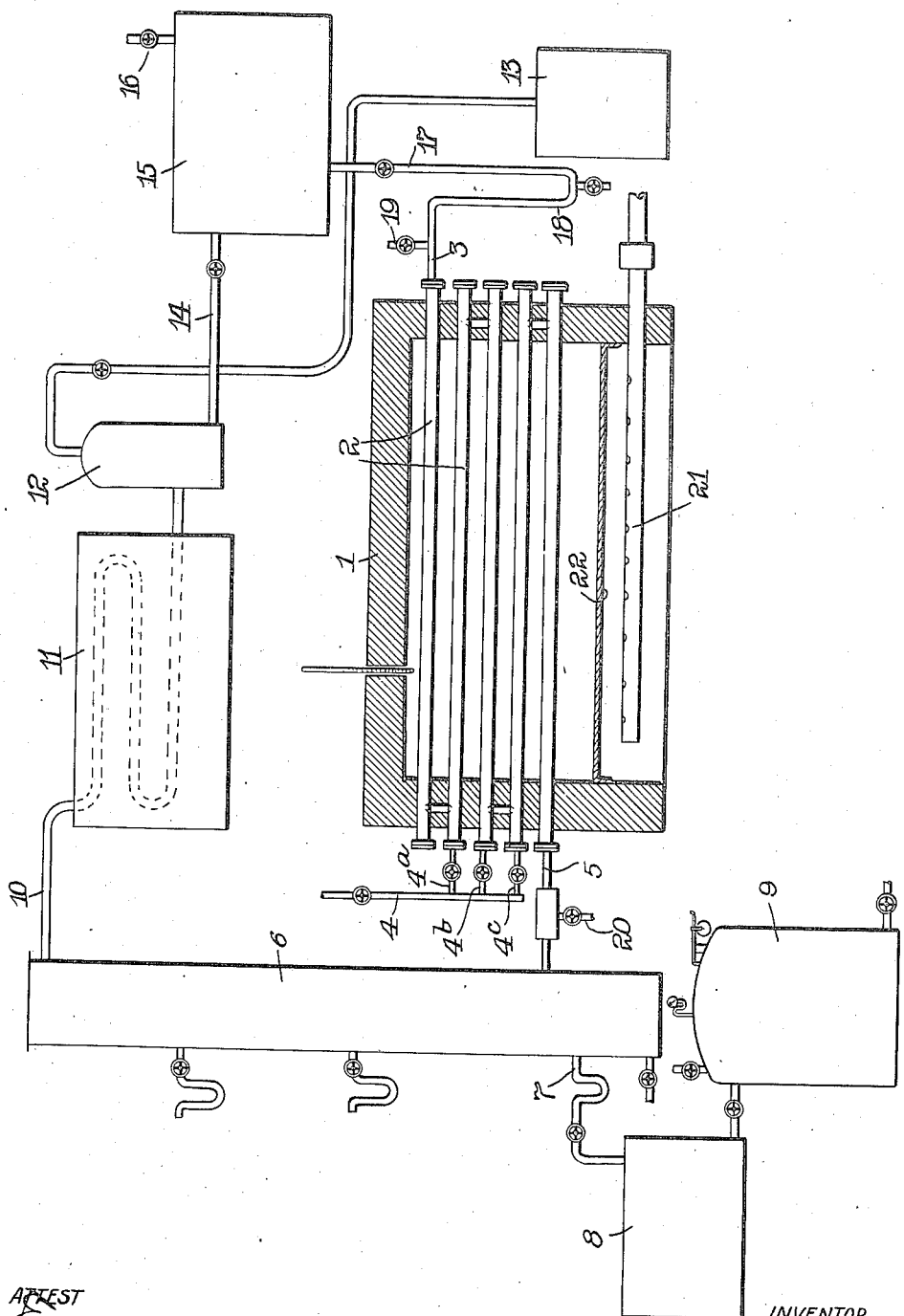

CARLETON ELLIS, OF MONTCLAIR, NEW JERSEY, ASSIGNOR TO CHADELOID CHEMICAL COMPANY, OF NEW YORK, N. Y., A CORPORATION OF WEST VIRGINIA.

COMPOSITE SOLVENT AND PROCESS OF MAKING SAME.

1,306,221.   Specification of Letters Patent.   Patented June 10, 1919.

Application filed September 16, 1914. Serial No. 861,959.

*To all whom it may concern:*

Be it known that I, CARLETON ELLIS, a citizen of the United States, and a resident of Montclair, in the county of Essex and State of New Jersey, have invented certain new and useful Improvements in Composite Solvents and Processes of Making Same, of which the following is a specification.

This invention relates to a process of making benzyl chlorid, benzyl alcohol and similar or allied material and to certain composite products of said processes, as will be hereinafter more particularly pointed out.

In the manufacture of benzyl chlorid, it has been customary to pass chlorin gas into toluene heated to the boiling point, and, as chlorination progresses so that a considerable quantity of chlorinated derivatives are formed, the boiling point of the mixture may eventually rise a number of degrees above that of toluene, so that a somewhat higher temperature may prevail in the chlorination apparatus at the close of the operation.

In order to introduce chlorin into the side-chain of toluene or other similar hydrocarbons and homologues, it has been recommended either to heat the hydrocarbon to boiling or to expose to sunlight while subjecting the hydrocarbon to the action of the chlorin. The latter method is very difficult to carry out on a large scale and the reaction is very variable in its rate, due to change in the actinic value of the light from day to day or hour to hour. Likewise, the treatment of a hydrocarbon such as toluene at or near its boiling point with a current of chlorin flowing through it does not accomplish a very rapid measure of chlorination, besides tending to the formation of undesirable products.

By the present invention toluene or other suitable or similar hydrocarbon preferably is treated in the form of a traveling stream or current of the vapor and chlorin gas, which preferably is superheated so as to bring about the reaction rapidly without the formation of excessive amounts of tarry bodies. For example, a temperature of 180° to 200° C. or thereabout may be employed or a superheat of 75° to 100° C. above the boiling point of toluene is possible and even higher temperatures may be resorted to under certain conditions.

By mixing toluene vapors in excess with chlorin, the tendency of the reaction apparently is to form benzyl chlorid rather than benzal chlorid or benzotrichlorid. By increasing the proportion of chlorin these latter products may be secured, but for the specific purposes of the present invention the preparation of benzyl chlorid is especially sought and will be herein described as an illustrative example of the process.

Toluene of reasonable purity is preferably first vaporized and chlorin mixed with it, using an excess of the toluene, preferably about twice as much toluene as chlorin gas based on their combining proportions. The mixed vapors and gas are passed through a heating zone, which may be for example a tubular heating system such as a coil of pipe and the like, in which heating zone the chlorin combines with the superheated toluene and benzyl chlorid is obtained. The vapors may be introduced under atmospheric pressure or they may be heated under higher pressures and if, for example, it is desired to operate with chlorin in the liquid form, pressures may be used which will keep the chlorin in this condition during a part or whole of the operation.

In the heating zone various surface contact bodies and catalytic material may be placed. Material which simply serves as a baffle without any pronounced catalytic action may likewise be employed. Fragments of pumice or fire-brick, coke, charcoal, fragments of iron or nickel and the like may be employed either as heat transmitting surfaces or in some cases perhaps as actual catalytic material. Clean charcoal, which has been burned so as to yield a light porous product, is useful in this connection.

When the reaction has gone to completion, or substantially so, the products will in the main be benzyl chlorid, unchanged toluene, hydrochloric acid and traces to more substantial quantities of benzal chlorid and benzotrichlorid. Of course, under some conditions a certain amount of chlortoluene is produced and at higher temperatures some tarry material. The next operation ordinarily is the separation of these bodies to the extent desired to produce marketable products.

The hot vapors may be passed into a dephlegmator, which may be of the column type, from the lower part of which the tar and more quickly condensable bodies are removed, followed by the benzal chlorid and benzotrichlorid, and then a fraction ranging from around 175° to 190° C. may be withdrawn, which will contain the benzyl chlorid. Chlortoluene may likewise be separated. The toluene vapors are then condensed and the hydrochloric acid withdrawn and absorbed in water or used for other purposes. If desired, the vapors of the toluene may be passed over some material capable of taking up the hydrochloric acid so that the toluene remains in a vaporized condition during its circuitous path of travel. But condensed as above stated, the liquid toluene may then flow into a receiver and from there pass through a trap to a series of heating tubes, with which it contacts with chlorin gas to again be subjected to the operation of chlorination, and while fresh quantities of toluene are added from time to time to make up for that withdrawn in the form of the chlorinated products of reaction. The toluene removed from the dephlegmator may be completely freed of hydrochloric acid by washing, but ordinarily this is not necessary or desirable as the small amount of hydrochloric acid present in the toluene which is returned to the heating zone is not sufficient in amount to materially affect the reaction. The presence of moisture in the system ordinarily is not desired, although with some hydrocarbons moisture is of some value in tending to accelerate the action.

The benzyl chlorid obtained in this way may be distilled, if desired, but for the preparation of a solvent suitable for use in accordance with the present invention a distillate ranging between 170° and 190° C. is useful and such a fraction may be treated for the production of the benzyl alcohol and associated bodies without close fractionation. This product is then treated with caustic soda, or caustic potash, quick-lime or other reactive alkali in the presence of water to produce benzyl alcohol and associated alcoholic material.

I have found that the conversion of the benzyl chlorid to benzyl alcohol takes place on heating the chlorid under superatmospheric pressure with a slight excess of caustic soda solution, for example to a temperature represented by fifty pounds pressure, the heat being carried on for several hours, and agitation being not necessarily required to secure the conversion. An agitator, of course, may be employed to mingle the caustic soda solution and the benzyl chlorid during the heating operation, but the said transformation to the product desired may be secured by simply heating without agitation, as aforesaid. The benzyl alcohol thus obtained may be rectified if desired by distillation or otherwise. On account of the formation of some benzal chlorid, a certain amount of benzaldehyde is usually present and may give the composition an odor of bitter almonds. In the alkali liquors will be found benzoic acid in the form of sodium benzoate resulting from the decomposition of benzotrichlorid. This may be recovered by refining. Chlortoluene may be recovered when it occurs in any substantial amount, or it may be distilled along with the benzyl chlorid and this mixture subsequently treated with alkali, which does not greatly affect the chlortoluene, and thus a mixture of benzyl alcohol and chlortoluene is obtained, which may be used as a composite solvent in the manufacture of paint and varnish removers.

During the operation of heating, the mixture of toluene and chlorin may be subjected to the action of ultra-violet light, or this exposure may occur before or after the heating stage. The mixture may be passed through a tube or other container made from clear quartz so as to permit the ultra-violet rays to directly act upon the vapor and gas.

By heating benzyl chlorid with acetate of sodium or other salts, such as the formate, benzoate, etc., various esters, such as benzyl acetate and the like, may be obtained. In this case the solvent instead of being water may be alcohol or the corresponding acid. For example, in the preparation of benzyl acetate, sodium or potassium acetate may be dissolved in ethyl alcohol or glacial acetic acid may be used as the vehicle and the operation carried out under pressure to effect the transformation desired.

In the accompanying drawing apparatus is shown by which the processes of the present invention may be carried out. In the drawing "1" is a heating chamber containing a series of pipes "2". Toluene is admitted at "3" and chlorin at "4". The discharge from the apparatus is shown at "5", which connects with the dephlegmator "6", from which benzyl chlorid or any suitable mixture of benzyl chlorid and other chlorinated material is withdrawn by the pipe "7" to the receiver "8", from which it passes to the alkali pressure tank "9". By means of the pipe "10", the toluene from the dephlegmator is withdrawn and condensed in the condensing apparatus "11", beyond which the hydrochloric acid vent-pipe "12" is arranged to withdraw the hydrochloric acid gas and collect and absorb it in the receiver "13". The condensed toluene substantially freed from hydrochloric acid flows along the pipe "14" to the receiver "15", where a fresh supply of toluene may be admitted by the feed-pipe "16". The toluene then passes through the trap "17" to the heating apparatus "1".

In the operation of the process using toluene as the material in the chamber, which may be maintained at 190° C., a mixture of two parts of toluene to one part of chlorin, based on their combining proportions, for the production of benzyl chlorid, is passed through the apparatus as a continuous stream and the dephlegmation takes place continuously, so that the toluene travels in a cyclic path, first meeting an insufficient amount of chlorin, when chlorination takes place under conditions tending to the formation in the main of the lower chlorinated derivatives, these are removed by dephlegmation, the hydrochloric acid is removed by condensing the toluene and the residue of the toluene is returned to the heating zone with such additions of fresh toluene as may be necessary in order to keep a sufficient supply of material in the apparatus.

When side-chain chlorination is not required, but instead it is desired to produce, say, a monochlor-hydrocarbon such as chlor-benzol, the temperature of the heating zone may be suitably modified and the proportion of chlorin to hydrocarbon proportioned so as not to have an excess of chlorin and avoid the production of di or tri chlor compounds. By having an excess of the hydrocarbon and by adding the chlorin at a series of inlet points situated along the heating zone, the tendency for any local concentration of chlorin and the consequent production to a greater or less extent of perchlorinated products is greatly reduced or eliminated. This is important when it is desired to convert, say, benzol into an ester such as phenyl acetate by heating monochlor-benzol with sodium acetate and glacial acetic acid or other vehicle to fifty or one hundred atmospheres pressure. Here the presence of perchlorinated products is undesirable and a source of loss. In the conversion of benzyl chlorid to benzyl alcohol, a small amount of sodium or potassium acetate may be added to the alkali in aqueous or alcoholic solution to facilitate the reaction.

In the chlorination of toluene with moist chlorin or chlorin containing oxygen, water will collect in the condensed toluene and may be removed by a trapped outlet, when the presence of water is not desired. Benzaldehyde which forms from benzalchlorid may be converted to benzoic acid and benzyl alcohol by heating with caustic alkali under pressure.

In the tube superheater, the introduction of chlorin at various points in the path of travel of the toluene vapors serves to effect chlorination to the mono stage without the necessity of introducing an excess of chlorin with the toluene initially brought into the superheater.

This application is a continuation in part of my co-pending application, Serial No. 574,432 and No. 715,325.

What I claim is:—

1. In the process of making a solvent composition adapted for the removal of old paint and varnish coatings, the steps which comprise chlorinating toluene partly in the side chain and partly in the benzene ring and in subsequently treating with a dechlorinating agent, whereby chlorin is selectively removed from the side chain and replaced by an hydroxyl group while the chlorin in the benzene ring is substantially unaffected, thereby yielding a mixture of an alcoholic body with a chlorinated hydrocarbon.

2. A composite solvent adapted for use in paint and varnish removing compositions comprising benzyl alcohol and chlor-toluene.

3. In the process of making a solvent composition adapted for the removal of old paint and varnish coatings, the steps which comprise chlorinating toluene partly in the side chain and partly in the benzene ring and in subsequently treating with an alkaline dechlorinating agent whereby chlorin is selectively removed from the side chain and replaced by a hydroxyl group while the chlorin in the benzene ring is substantially unaffected thereby yielding a mixture of an alcoholic body with a chlorinated hydrocarbon.

4. A composite solvent adapted for use in paint and varnish removing compositions comprising benzyl alcohol and chlorinated solvent material containing chlortoluene.

CARLETON ELLIS.

Witnesses:
 JOHN H. HILLIARD,
 ALBERT E. THAYER.